United States Patent [19]

Iverson

[11] Patent Number: 5,207,305
[45] Date of Patent: May 4, 1993

[54] METHOD AND APPARATUS FOR INCORPORATING HYDRODYNAMIC FILM TO TRANSFER OR RETARD MOTION AND DISSIPATE HEAT

[75] Inventor: Roger A. Iverson, Fayetteville, Ak.

[73] Assignee: Advanced Brake & Clutch Co., Inc., Fayetteville, Ak.

[21] Appl. No.: 749,660

[22] Filed: Aug. 26, 1991

Related U.S. Application Data

[63] Continuation of Ser. No. 299,070, Jan. 19, 1989, abandoned.

[51] Int. Cl.$^5$ .................. F16D 35/00; F16D 57/02
[52] U.S. Cl. .................. 192/58 C; 192/70.15; 192/113 B; 188/71.6; 188/264 E
[58] Field of Search .......... 192/58 C, 70.12, 113 B; 188/71.6, 264 B, 264 E

[56] References Cited

U.S. PATENT DOCUMENTS

| 3,390,748 | 7/1968 | Hein et al. | |
|---|---|---|---|
| 3,981,381 | 9/1976 | Nosek | 192/113 B |
| 4,040,271 | 8/1977 | Rolt et al. | |
| 4,042,085 | 8/1977 | Bjerk et al. | 188/364 E X |
| 4,207,969 | 6/1980 | Howell | 188/71.6 |
| 4,358,001 | 11/1982 | Iverson | 188/71.6 |
| 4,624,353 | 11/1986 | Sailer et al. | 192/70.12 |

FOREIGN PATENT DOCUMENTS 0143898 6/1985 European Pat. Off. .
0225389 1/1986 European Pat. Off. .
651876 4/1951 United Kingdom ............ 188/264 E

OTHER PUBLICATIONS

McCarty, L. H. "Carbon/Carbon Design Extends Clutch Life", *Design News* (Nov. 23, 1987).
Renfroe, D. A. et al. "Long Term High Energy Clutch/Braking Technique," SAE Technical Paper #861346 (Sep. 22, 1986).
Stempien, V. M. "Wet Disc Brakes for Off-Highway Vehicles," SAE Technical Paper #811288 (Nov. 9, 1981).
University of Arkansas Thesis by D. E. Richardson, "The Deleterious Effects of Fluid Levels in a Wet Clutch Assembly", submitted Aug., 1987.
Society of Automotive Engineers Technical Paper No. 690268, "Torque Capacity of a Multidisc Clutch," by R. N. Reddy, D. D. Sen and M. S. Keshav (Jan. 13–17, 1979).

*Primary Examiner*—Richard M. Lorence
*Attorney, Agent, or Firm*—Richards, Medlock & Andrews

[57] ABSTRACT

The present invention is an apparatus and method for capturing a hydrodynamic film between two working surfaces whereby the hydrodynamic film separates the two working surfaces while transmitting mechanical energy between the two thereby greatly reducing wear while dissipating thermal energy produced from the transfer of mechanical energy.

18 Claims, 4 Drawing Sheets

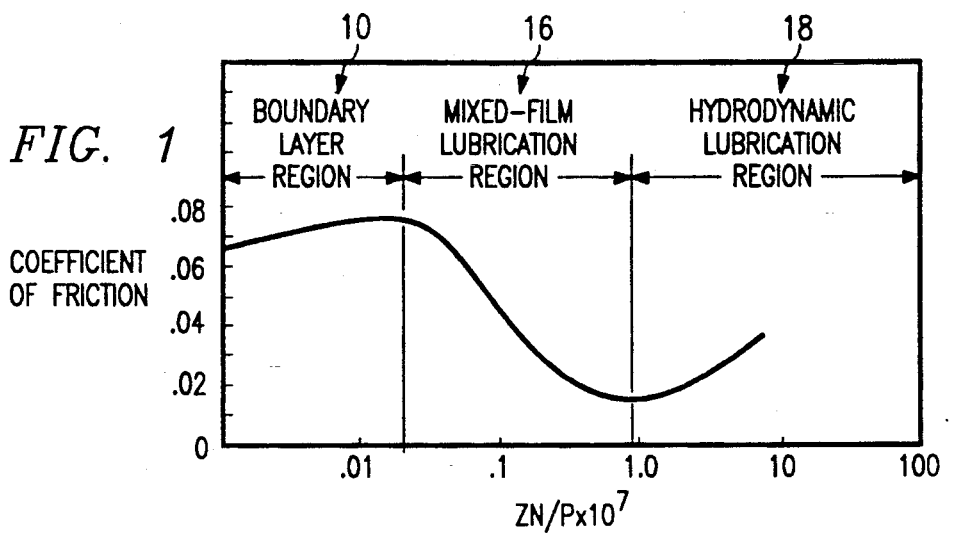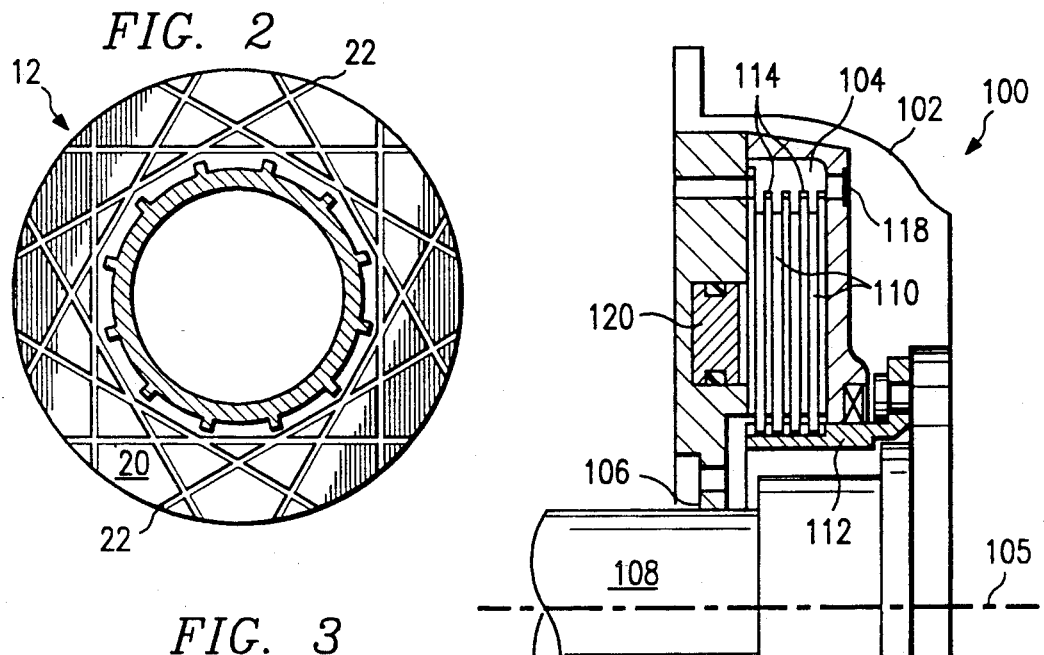

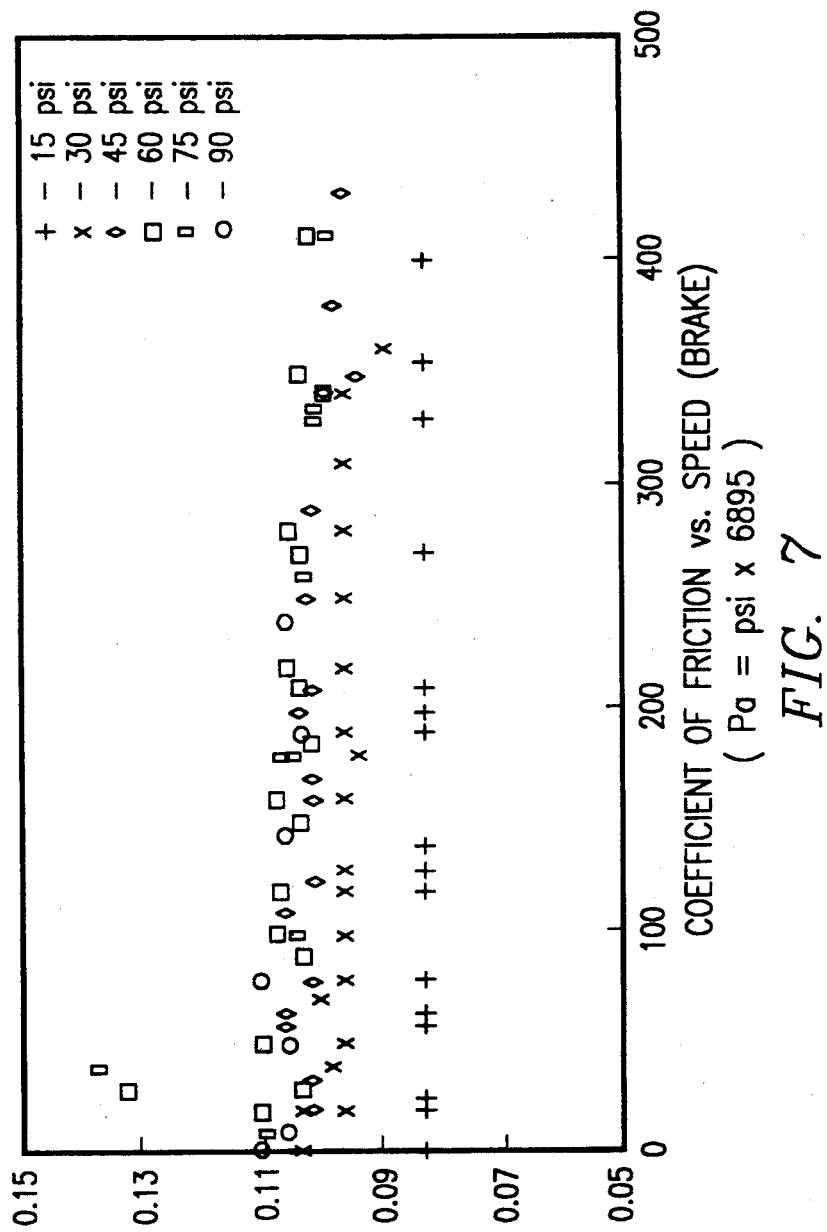

METHOD AND APPARATUS FOR INCORPORATING HYDRODYNAMIC FILM TO TRANSFER OR RETARD MOTION AND DISSIPATE HEAT

This is a continuation of application Ser. No. 299,070 filed on Jan. 19, 1989 now abandoned.

TECHNICAL FIELD

The present invention relates to the field of friction couplings such as transmissions, clutches and brakes, that incorporate the use of fluids between their mating surfaces to achieve desired energy absorbing and heat transfer properties.

BACKGROUND OF INVENTION

In automobile applications, friction couplings have long been incorporated as a means to transmit or retard drive, i.e., brakes, clutches and transmissions. Rotor and stator plates are forced together and are generally encased in a dry environment so as to enhance friction characteristics. However, friction produces a great amount of heat and wear between said plates, requiring the replacement of parts and the repair of said assemblies.

A need arose to reduce the wear generated by the friction loading of the rotors and stators. As an example, wet disc friction brakes are known in the prior art. British Patent No. 651,867 and U.S. Pat. No. 3,410,375 illustrate and describe such systems. Oil, being a lubricant, tends to reduce wear associated with friction. However, the oil also reduces friction and therefore braking power. Thus increased surface area is required in order to ensure braking power in wet disc brake systems.

Wet disc brake systems have been proven to be effective and economical in many industrial and off-highway applications. However, wet disc brake systems have not enjoyed the same success in road transportation applications.

Typically, rotors and stators of a braking system are encased in a housing which is filled to capacity with oil. The oil acts to reduce wear which occurred between the mating faces of the rotors and stators, when the brakes are applied. Two factors make the design unattractive. First, high parasitic drag results from the rotors spinning in a housing full of oil which decreases fuel economy to an unacceptable level. Second, since oil is a heat capacitor, wet disc brake systems generally employ pumps and flow lines to circulate oil through the housing to transfer heat away from the rotors and stators.

Therefore, a system is needed which greatly reduces parasitic drag, has heat transfer properties thereby negating the need for pumping oil in and out of the housing. Said system must also reduce wear to the rotors and stators while sufficiently absorbing the friction and energy generated between the rotors and stators during brake application. Further, such a brake system must meet the specifications set out in Federal regulations.

SUMMARY OF INVENTION

The present invention incorporates oil and a gas, such as air to form a hydrodynamic film between the mating surfaces of plates being utilized to control speed and torque. The hydrodynamic film is a result of the proper amount of oil entrained with air or another medium. The hydrodynamic film is capable of transferring high amounts of thermal energy from the plates while absorbing mechanical energy from the rotating plates. This energy absorption occurs without the plates making actual physical contact thereby greatly reducing wear occurring to the plates. This is accomplished while maintaining a sufficient braking force to meet Federal standards.

In accordance with one aspect of the present invention a brake assembly is provided which has a series of interleaved rotors and stators. The rotors and stators are encased in a housing which is 17%–40% full of oil by volume at rest.

During forward motion of the vehicle, the rotors agitate the oil entraining air into such, much like a foam. To retard the forward motion of the vehicle, the rotors and stators are forced together. Trapped between the rotors and stators is a hydrodynamic film of oil and air. The hydrodynamic film absorbs the energy and heat created by the braking action thereby greatly reducing wear to the rotors and stators, while transferring mechanical energy between the rotors and stators.

BRIEF DESCRIPTION OF THE DRAWINGS

A better and more complete understanding of the present invention and advantages thereof will be gained from the following Detailed Description, Claims and accompanying Drawings, in which:

FIG. 1 is a graph depicting relationship between ZN/P and the coefficient of friction.

FIG. 2 is a frontal view of a friction plate.

FIG. 3 is a sectional view of the present invention as a friction coupling, disengaged.

FIG. 4 is a sectional view of the present invention as a brake system.

DETAILED DESCRIPTION

Figure 5:
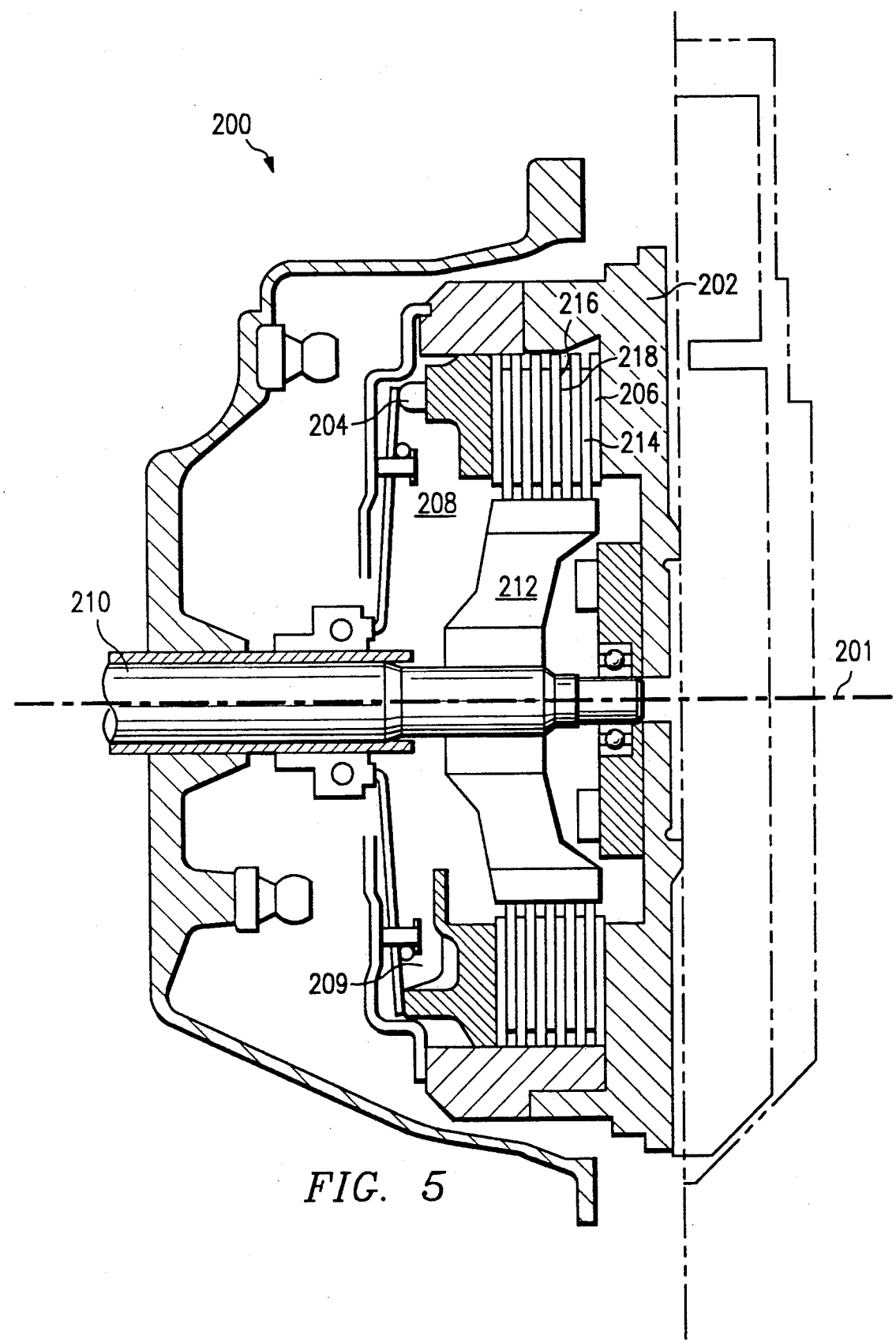
FIG. 5 is a sectional view of another embodiment of the present invention as a clutch assembly.

FIG. 1 generally depicts a relationship of the coefficient of friction to the dimensionless parameter, ZN/P, (where Z is the viscosity of oil, N is speed, and P is pressure). FIG. 1 illustrates the operating characteristics of the present invention. As can be readily seen, the coefficient of friction varies for a particular lubricant as a function of ZN/P. The boundary layer region 10 is characterized by high pressure and relatively low values for the viscosity and speed. A standard automobile wet disc brake assembly operates in the boundary layer region 10. No fluid film is developed between the mating surfaces, such as on plate 12, during operation. In this region the asperities of the plate face are constantly rubbing against each other causing wear and higher friction. The boundary layer defines the envelope in which present wet clutch or brake systems are designed to operate. The heat generated in the system during slippage substantially remains with the plate 12 and is not efficiently carried away by the lubricant.

The mixed-film lubrication region 16 shows a sharp decline in the coefficient of friction as ZN/P increases. In the mixed film lubrication region 16 the clamping force on the plate 12 is so large or the sliding velocity so low, that fluid film cannot completely separate the plate 12 surfaces. The mixed-film lubrication region 16 is analogous to hydroplaning which can occur between the tires of a car and a road when water is on the road surface. Operation in this region is undesirable.

In the hydrodynamic lubrication region 18 the plates 12 are separated by a fluid film which absorbs torque energy as well as heat, while reducing wear due to contact between plates 12. As can be seen in FIG. 1, as ZN/P increases the coefficient of friction begins to rise in the hydrodynamic lubrication region. As a further aspect of the present invention, air, or another medium, is entrained in the fluid film, substantially increasing the coefficient of friction relative to ZN/P. An effective coefficient of friction for the air entrained fluid film between the plates 12 of 0.08 to 0.12 is possible with little resulting wear, as seen in the graph shown as FIG. 7.

FIG. 2 generally depicts a plate 12 which may be employed as a rotor 110 or stator 114. Plate 12 has surface 20 which incorporates grooves 22. The grooves 22 enhances circulation of oil within the brake, clutch or transmission assembly. Generally, plates 12 are composed of a standard brake or clutch material, such as graphite or asbestos-molded, woven or impregnated materials.

FIG. 3 is a sectional view of the present invention as a friction coupling 50, in a disengaged position. Friction coupling 50 generally incorporates a drive shaft 52 rotationally driven by a suitable means such as a motor, etc. Rotor disc 54 having a drive face 56 and working face 58 is fixedly attached to drive shaft 52 by suitable means such as fasteners or bolts. Rotor disc 54 is positioned whereby drive shaft 52 is attached to the center 60 of the drive face 56 of rotor disc 52, perpendicular to axis of rotation 62.

Opposed to the working face 58 of rotor disc 54 is output disc 64 fixedly attached to output shaft 66. Output shaft 66 extends along the axis of rotation 62. Output disc 64 is fixedly attached to output shaft 66 at the center 67 of the output face 68 perpendicular to the axis of rotation 62. Output disc 64 has working face 70 which opposes working face 58 of rotor disc 54.

Housing 72 encases rotor disc 54 and output disc 64. Drive shaft 52 and output shaft 66 pass through walls 74 and 76 of housing 72 respectively whereby each may rotate freely about axis of rotation 62 as shown by arrow 78. Housing 72 forms cavity 80 which contains a particular amount of viscous fluid 81 such as oil, capable of operating at temperatures between −60° and 450° and higher, ranging from 17% to 40% by volume of cavity 80. More specifically:

$$\%F = 63(Ap/Ac) \quad (1)$$

Where:
  %F = % fluid level by volume of the housing,
  Ap = area of the working face of a rotor or stator,
  Ac = cross sectional area of the housing cavity, said cross section being the sectional area coplanar with said rotor disc and perpendicular to said axis of rotation.

Fluid levels below 17% will induce catastrophic failure of the friction coupling 50. Fluid levels greater than 40% will not induce hydrodynamic film during coupling thereby eliminating the effects of the present invention The fluid level in cavity 80 must be maintained at the proper level so as to produce the hydrodynamic film effects and achieve the desired properties of the present invention.

The working face 58 of the rotor disc 54 and working face 70 of output disc 64 may be forced together while rotor disc 54 is rotating about the axis of rotation 62. The viscous fluid is agitated by rotor disc 54 whereby air or another specified medium is entrained in said oil, much like a foam or emulsion. For purposes of this specification, air shall mean any gas, fluid or combination of fluids. As the working faces 58 and 70 approach each other, a hydrodynamic film is captured between them, separating the two faces 58 and 70. The hydrodynamic film absorbs the torque transmitted from rotor disc 52 and transfers said torque to output disc 64 thereby driving said output shaft 66.

The air entrained fluid also acts as a heat dissipator transferring heat from the rotor disc 54 and output disc 64 to the housing 72 and surroundings. Since the asperities of the rotor discs 54 and output discs 64 are separated by the hydrodynamic film, wear is kept at a minimum. Wear may occur during the transition phases (boundary layer and mixed-film regions) as the operation of friction coupling 50 moves toward and away from the hydrodynamic lubrication region 18 as depicted in FIG. 1.

An important feature in the design of the present invention is that it allows radial oil flow through grooves 22 located in plates 12. This enhances the formation of a fluid film between the plates 12 for hydrodynamic lubrication. The fluid film is the energy absorber of the present invention. During the slipping operation, torque is transmitted through shearing of the fluid. The torque multiplied by the slipping speed is the energy absorbed by the fluid film. The high radial velocity of the fluid then transfers the energy out from the inner-disc space and heat transfer carries the energy to the surroundings. Since the asperities on the plates 12 are separated by the hydrodynamic film, wear is greatly reduced while maintaining a coefficient of friction greater or equal to 0.08. See FIG. 1.

FIG. 4 depicts one form of the present invention as a brake assembly 100. Brake assembly 100 generally incorporates a housing 102 having a cavity 104 and axis of rotation 105. Said housing 102 is disc shaped and has an orifice 106 extending through its center 109 along the axis of rotation 105. Orifice 106 has a predetermined diameter so as to accommodate axle 108 or other driving means.

Mounted for rotation inside housing 102 are a series of rotor discs 110 The rotor discs 110 axially translate within housing 102 along axis of rotation 105, while being rotated by a drive force such as axle 108 through spindle 112. Rotor discs 110 are splined, or by other means connected, to spindle 112. Spindle 112 is connected to axle 108 by bolts, keys, weld or other suitable means, for rotating rotor discs 110.

Interleaved with the rotor discs 110 are stator discs 114. Stator discs 114 are splined or by other means connected to housing 102 such that they translate axially within housing 102 along axis of rotation 105. They are held in position, against rotation by bolt 118.

Pistons 120 may be actuated so as to bring rotor discs 110 and stator discs 114 together. The stator discs 114 frictionally oppose rotation of the rotor discs 110 through the hydrodynamic film captured between the working faces of each. The hydrodynamic film is produced from the viscous fluid such as oil 116 located in housing 102. The rotor discs 110 circulates the oil 116, entraining air or another medium in the oil 116.

The hydrodynamic film absorbs the torque transmitted from the rotor discs 110 to the stator discs 114. The air entrained fluid also acts as a heat dissipator transferring heat from the rotor discs 110 and stator discs 116 to the housing 102 and surroundings. Since the asperities of the rotor discs 110 and stator discs 116 are separated by the hydrodynamic film, wear is kept at a minimum. Wear may occur during the transition phases (boundary layer and mixed-film regions) as the operation of brake assembly 100 moves toward and away from the hydrodynamic lubrication region 18 as depicted in FIG. 1.

FIG. 5 depicts another embodiment of the present invention incorporated into a clutch assembly 200 having axis of rotation 201. Flywheel 202 is connected to rotor discs 206, located in the cavity 208 between the flywheel 202 and pressure plate 204. Rotor discs 206 are splined, or otherwise connected to the flywheel 202 so as to allow axial movement within cavity 208 along axis of rotation 201. Cavity 208 is 17% to 40% by volume, filled with viscous fluid such as oil 209. The fluid level of cavity 208 must be maintained at the proper level so as to produce the hydrodynamic film effects and achieve the desired properties of the present invention. The fluid level may be determined by equation (1).

Drive shaft 210 is connected to spindle 212 located in cavity 208. Stator discs 214 are splined or otherwise connected to spindle 212 so as to allow axial movement within cavity 208 along axis of rotation 201.

Flywheel 202 is rotated about axis of rotation 201 by a power source such as an internal combustion engine, thereby rotating the rotor discs 206. Pressure is applied to the pressure plate 204 thereby engaging the working faces 216, 218 of the rotor disc 206 and stator discs 214 respectively. Captured between the working faces 216, 218 is a hydrodynamic film of air entrained viscous fluid. The hydrodynamic film transmits the torque from flywheel 202 through rotor discs 206 to stator discs 214 and drive shaft 210.

Since the asperities of the rotor and stator discs 206 are separated by the hydrodynamic film, friction and wear are greatly reduced. Thus, wear due to clutch slippage is greatly reduced. In automobiles, clutch slippage occurs when a clutch is engaged while the automobile is on an inclined surface or the clutch pedal is not fully depressed or released during shifting and engagement respectively. The present invention tolerates clutch slippage through the hydrodynamic film. Energy and torque transmitted through the disc is absorbed by the film rather than by the discs themselves. Wear is thereby greatly reduced.

Figure 6:
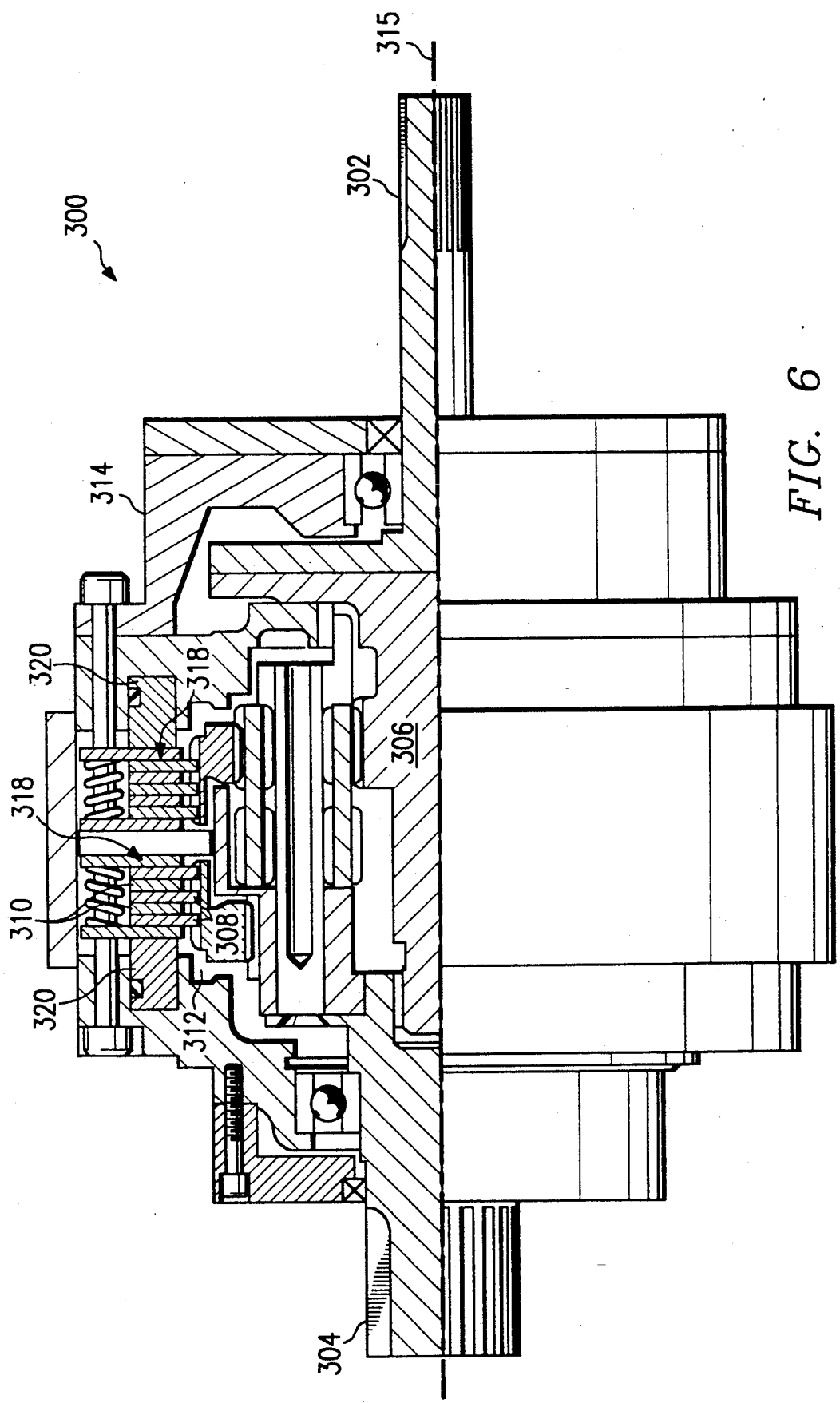
FIG. 6 is a section view of another embodiment of the present invention as a transmission assembly.

FIG. 6 depicts another embodiment of the present invention as transmission assembly 300. Assembly 300 generally incorporates the operating principle of the brake assembly 100 and clutch assembly 200. Drive shaft 302 is driven by an internal combustion engine or the like. Torque from shaft 302 is to be transmitted to output shaft 304 through transmission assembly 300. Transmission assembly 300 is much like a conventional transmission, incorporating planetary gear 306 for employing the torque from drive shaft 302 to drive output shaft 304. To accomplish this, the planetary gear 306 must be engaged and disengaged at proper intervals, in relation to torque.

Engagement or clutching of the planetary gear 306 to transmit the torque from drive shaft 302 to output shaft 304 is accomplished through a series of friction discs 308 and reaction disc 310. The friction discs 308 are splined to the planetary gear 306 and may translate axially in cavity 312 of transmission housing 314 along axis of rotation 315. The reaction discs 310 are interleaved with the friction plates 308 and splined to housing 314 and may translate axially in cavity 312 along axis of rotation 315.

Cavity 312 is partially filled with viscous fluid such as oil 322, 17% to 40% by volume. The fluid level in cavity 312 must be maintained at the proper level so as to produce the hydrodynamic film effects and achieve the desired properties of the present invention. The fluid level may be determined by equation (1).

Pistons 320 are located on either side of the disc stack 318 and may be actuated, bringing friction discs 308 and reaction disc 310 together. The hydrodynamic film is captured between the working faces of the friction discs 308 and reaction discs 310 respectively, and absorbs the torque energy and heat transmitted between them. Torque is thereby transmitted from the drive shaft 302 to the output shaft 304.

In designing one of the systems as illustrated above, one must first know the amount of energy which the system must absorb. For example, in designing a braking system the energy which must be absorbed by the braking system is equal to the energy generated by the moving vehicle which is represented by the equation:

$$E = mv^2/2$$

Where:
E = Energy of the vehicle;
M = mass of vehicle;
V = equals velocity the vehicle is travelling.

Knowing how much energy must be absorbed by the braking system, the braking system may be designed in a number of ways. Examples of standard brake, clutch and transmission design analysis may be found in *Mark's Standard Handbook for Mechanical Engineers*, (9th Ed.); Bosch, *Automative Hand Book* (2d Ed.); Baker, *Vehicle Braking*. All are hereby incorporated by reference.

Friction is utilized in braking systems as the retarding force and must be properly accounted for. Under the present invention, oil is present in the braking system housing. The oil is entrained with air as the rotors rotate. When the brakes are applied, the discs are forced together, a hydrodynamic film is captured between the mating surfaces of the discs and absorbs the work being done by the brake and dissipates heat. This hydrodynamic film phenomena maintains unique friction properties.

Drag is produced by engaging the plates, which counteracts the energy of the vehicle and describes the friction properties of the rotor and stator discs with hydrodynamic film between the mating surfaces. Drag is a function of velocity, area, pressure (force) and viscosity; producing an infinite series dimensionless equation;

$$\text{Drag}/AP = K_1 \left( \frac{ZV}{PA^{.5}} \right)^{d1} + \cdots \quad (2)$$

The coefficient of friction is the longitudinal force divided by the normal force. Drag is the tangential force on the plates, and the area of the plates multiplied by pressure is the normal force. Thus:

the coefficient of friction = drag/AP

Where:
A = area of the plate face;

P=force exerted on the plate.

This dimensionless number is analogous to the term ZN/P. However, ZN/P fails to account for the area of the plates. Therefore:

$$\text{Clutch Number} = \frac{ZV}{PA^{.5}} \quad (3)$$

$$\text{The coefficient of friction} = \frac{\text{Drag}}{AP} \quad (4)$$

Drag=tangential force on the plate;
A=clutch plate area;
P=force exerted on the plate;
V=average of longitudinal velocity of the plate;
Z=absolute viscosity of the fluid.

The present invention sets out apparatuses and a method for utilizing friction couplings incorporating hydrodynamic film to absorb mechanical energy and heat. This phenomena is accomplished by utilizing a series of plates in a housing having a specific amount of oil whereby rotation of the plates entrains air in the oil. During friction engagement of the plates, hydrodynamic film is captured between the plates and absorbs or transmits energy between the two plate surfaces. In designing the system, the amount of oil must be determined as well as the surface area that is required to absorb the energy generated by the system.

Equation (3) concerning the clutch number, involves taking an arbitrary number to represent the clutch number and solving the other side of the equation to determine the area required. This can be done for a series of numbers thereby developing a curve which can be graphed relating the coefficient of friction to the clutch number. From such a graph, the proper clutch number and area of the plates can be obtained knowing the proper design criteria of the system. The percent of fluid to be contained in the housing is directly related to the area of the plate in relation to the cross sectional area of the housing. Knowing the area of the plates required and the size of the housing, one can determine the amount of fluid to be contained in the housing through equation (1).

Although several embodiments of the invention have been illustrated in the accompanying drawings and described in the foregoing Detailed Description, it will be understood that the invention is not limited to the embodiments disclosed, but is capable of numerous rearrangements, modifications and substitutions without departing from the scope of the invention.

I claim:

1. A friction coupling, comprising:
   a housing having a cavity of given volume and cross sectional area;
   at least two opposing surfaces co-planer with the cross sectional area of the cavity and each having an area;
   a means to drive one surface relative to the opposing surface;
   a means for bringing said surfaces adjacent to each other; and
   said surfaces located in a specific amount of viscous fluid entrained with air whereby bringing said surfaces adjacent to each other captures a hydrodynamic film of viscous fluid and air between said surfaces, said hydrodynamic film separating said surfaces while transmitting drive from said drive surface to said opposing surface, said specific amount of viscous fluid being within a range from 17 to 40% by volume of said cavity and directly related to the ratio of the area of the opposing surfaces to the cross sectional area of the cavity of said housing.

2. The friction coupling of claim 1 wherein said opposing surfaces are grooved so as to provide circulation when said surfaces are brought adjacent to each other.

3. The friction coupling of claim 1 wherein said viscous fluid is oil capable of operating at temperatures between −60° and 450° F.

4. The friction coupling of claim 1 wherein said coupling is a brake assembly further comprising:
   a housing having a cavity having a volume;
   said driving means is a rotating axle;
   said opposing surfaces are at least one stator disc and one rotor disc;
   said means for bringing the surfaces adjacent to each other is at least one piston; and
   said specific amount of viscous fluid is located within said cavity and the amount of said fluid ranges from 17% to 40% by volume of said cavity.

5. The friction coupling of claim 1 wherein said coupling is a clutch assembly further comprising:
   a housing having a cavity having a volume;
   said driving means is a rotating shaft;
   said opposing surfaces are at least one stator disc and one rotor disc;
   said means for bringing the surfaces adjacent to each other is a pressure plate; and
   said specific amount of viscous fluid is located within said cavity and the amount ranges from 17% to 40% by volume of said cavity.

6. The friction coupling of claim 1 wherein said coupling is a transmission assembly further comprising:
   a housing having a cavity having a volume;
   said driving means is a rotating shaft innerconnected with said drive surface through a planetary gear assembly;
   said opposing surfaces are at least one stator disc and one rotor disc;
   said means for bringing the surfaces adjacent to each other is at least one piston; and
   said specific amount of viscous fluid is located within said cavity and the amount ranges from 17% to 40% by volume of said cavity.

7. A frictional coupling forming a brake assembly, comprising:
   at least two opposing surfaces;
   a means to drive one surface relative to the opposing surface;
   a means for bringing said surfaces adjacent to each other;
   said surfaces located in a specific amount of viscous fluid entrained with air whereby bringing said surfaces adjacent to each other captures a hydrodynamic film of viscous fluid and air between said surfaces, said hydrodynamic film separating said surfaces while transmitting drive from said drive surface to said opposing surface;
   a housing having a cavity having a volume;
   said driving means being a rotating axle;
   said opposing surfaces being at least one stator disc and one rotor disc;
   said means for bringing the surfaces adjacent to each other is at least one piston;

said specific amount of viscous fluid is located within said cavity and the amount of said fluid ranges from 17% to 40% by volume of said cavity;

said stator and rotor disc have working surfaces, said volume of viscous fluid being directly related to the ratio of the area of the working surface of said rotor disc to the cross sectional area of the cavity of said housing.

8. A friction coupling forming a clutch assembly, comprising:
- at least two opposing surfaces;
- a means to drive one surface relative to the opposing surface;
- a means for bringing said surfaces adjacent to each other;
- said surfaces located in a specific amount of viscous fluid entrained with air whereby bringing said surfaces adjacent to each other captures a hydrodynamic film of viscous fluid and air between said surfaces, said hydrodynamic film separating said surfaces while transmitting drive from said drive surface to said opposing surface;
- a housing having a cavity having a volume;
- said driving means being a rotating shaft;
- said opposing surfaces being at least one stator disc and one rotor disc;
- said means for bringing the surfaces adjacent to each other being a pressure plate;
- said specific amount of viscous fluid is located within said cavity and the amount ranges from 17% to 40% by volume of said cavity;
- said rotor and stator disc having working surfaces, said volume of viscous fluid being directly related to the ratio of the area of the working surface of said rotor disc to the cross sectional area of the cavity of said housing.

9. A friction coupling forming a transmission assembly, comprising:
- at least two opposing surfaces;
- a means to drive one surface relative to the opposing surface;
- a means for bringing said surfaces adjacent to each other;
- said surfaces located in a specific amount of viscous fluid entrained with air whereby bringing said surfaces adjacent to each other captures a hydrodynamic film of viscous fluid and air between said surfaces, said hydrodynamic film separating said surfaces while transmitting drive from said drive surface to said opposing surface;
- a housing having a cavity having a volume;
- said driving means being a rotating shaft interconnected with said drive surface through a planetary gear assembly;
- said opposing surfaces being at least one stator disc and one rotor disc;
- said means for bringing the surfaces adjacent to each other being at least one piston;
- said specific amount of viscous fluid being located within said cavity and the amount ranging from 17% to 40% by volume of said cavity;
- said rotor and stator disc have working surfaces, and said volume of viscous fluid being directly related to the ratio of the area of the working surface of said rotor disc to the cross sectional area of the cavity of said housing.

10. A brake assembly connected to a rotor means comprising;
- a housing having an axis of rotation and a cavity having a volume;
- at least one rotor disc located within said housing for rotation about said axis of rotation;
- means to connect said rotor disc to said rotor means whereby said rotor disc may translate along said axis of rotation within said cavity;
- at least stator disc located within said housing about said axis of rotation juxtaposed with said rotor disc;
- means to connect said stator disc to sid housing whereby said stator disc does not rotate and may translate along said axis of rotation;
- said housing having a pre-determined amount of viscous fluid within said cavity, the amount of fluid arranging from 17% to 40% by volume of the cavity of said housing, the rotating action of said rotor disc entraining air in said viscous fluid;
- means to bring said rotor disc and stator disc adjacent to each other whereby a hydrodynamic film of viscous fluid and air is captured between said rotor disc and stator disc, separating said rotor disc and stator disc while transmitting torque from said rotor disc to said stator disc;
- the volume of said viscous fluid being directly related to the ratio of the area of the working surface of said rotor disc to the cross sectional area of the cavity of said housing, where the percentage volume is approximately equal to 63 (Ap/Ac) where Ap is equal to the area of the working face of the rotor or stator and Ac is equal to the cross sectional area of the housing cavity.

11. The brake assembly of claim 10 wherein said means to bring said rotor disc and stator disc adjacent to each other is at least one piston.

12. A brake assembly connected to a rotor means comprising:
- a housing having an axis of rotation and a cavity having a volume;
- at least one rotor disc located within said housing for rotation about said axis of rotation;
- means to connect said rotor disc to said rotor means whereby said rotor disc may translate along said axis of rotation within said cavity;
- at least one stator disc located within said housing about said axis of rotation juxtaposed with said rotor disc;
- means to connect said stator disc to said housing whereby said stator disc does not rotate and may translate along said axis of rotation;
- said housing having a predetermined amount of viscous fluid within said cavity, the amount of fluid ranging from 17% to 40% by volume of the cavity of said housing, the rotating action of said rotor disc entraining air in said viscous fluid;
- means to bring said rotor disc and stator disc adjacent to each other whereby a hydrodynamic film of viscous fluid and air is captured between said rotor disc and stator disc, separating said rotor disc and stator disc while transmitting torque from said rotor disc to said stator disc;
- said means to bring said rotor disc and stator disc adjacent to each other being at least one piston;
- the volume of said viscous fluid being directly related to the ratio of the area of the working surface of said rotor disc to the cross sectional area of said cavity, where the percentage volume of fluid is approximately equal to 63 (Ap/Ac) where Ap is equal to the area of the working surface of the rotor or stator and Ac is equal to the cross sectional area of the housing cavity.

13. A transmission assembly connected to a rotating axle comprising:
   a housing having an axis of rotation and a cavity having a volume;
   an output shaft;
   a planetary gear assembly interconnected with said rotating axle;
   at least one rotor disc having a working surface, located within said housing for rotation about said axis of rotation;
   means to connect said rotor disc to said planetary gear assembly whereby said rotor disc may translate along said axis of rotation within said cavity;
   at least one drive disc having a working surface located within said housing about said axis of rotation juxtaposed with said rotor disc;
   means to connect said drive disc to said output shaft whereby said drive disc may translate along said axis rotation;
   said housing having a predetermined amount of viscous fluid within said cavity, the amount of fluid ranging from 17%–40% by volume of said cavity of said housing wherein the volume of said viscous fluid is directly related to the ratio of the area of working surface of said rotor disc to the cross sectional area of the cavity of said housing;
   a means to intermittently bring said rotor disc and said stator disc adjacent to each other whereby a hydrodynamic film of viscous fluid and air is captured between said rotor disc and stator disc, separating said rotor disc and said stator disc while transmitting torque from said rotor disc to said stator disc.

14. The transmission assembly of claim 13 wherein said viscous is oil capable of operating at temperatures between −60° and 450° F.

15. A method for transferring torque and heat through hydrodynamic film captured between two surfaces which comprises:
   locating a first and second disc having working surfaces within a housing having a cavity having a volume;
   juxtaposing the working surface of said discs;
   filling said cavity with viscous fluid 17% to 40% by volume;
   rotating said first disc;
   bringing the working faces of said first disc adjacent to the working face of said second disc;
   calculating the volume of said viscous fluid which is directly related to the ratio of the area of the working surface of said rotor disc to the cross sectional area of the cavity of said housing.

16. A method for transferring torque and heat through hydrodynamic film captured between plurality of surfaces which comprise:
   locating a plurality of rotor discs having working surfaces within a housing having a cavity having a volume;
   juxtaposing a plurality of stator discs having working surfaces to said rotor discs within said housing;
   filling said cavity with viscous fluids 17% to 40% by volume;
   rotating said rotor discs;
   bringing the working faces of said rotor discs adjacent to the working faces of said stator discs;
   the volume of said viscous fluid being directly related to the ratio of the area of the working surfaces of said rotor discs to the cross sectional area of the cavity of said housing where the percentage volume of fluid is approximately equal to 63 (Ap/Ac) where Ap is equal to the area of a working face of the rotor or stator and Ac is equal to the cross sectional area of the housing cavity.

17. A method for designing a friction coupling for a transmitting drive brake, transmission or clutch system which comprises:
   calculating the amount of mechanical energy to be transmitted by said system;
   selecting a housing having a cavity having a volume;
   selecting friction plates having a known surface area for locating in said housing;
   juxtaposing said friction plates;
   connecting one half of said friction plates to a drive means;
   connecting one half of said friction plates to the body said drive is to be transmitted to; and
   calculating the volume of viscous fluid to partially fill said cavity, said volume ranging from 17% to 40% by volume of said cavity where the percentage volume of fluid is approximately equal to 63 (Ap/Ac) where Ap is equal to the area of the working face of the rotor or stator and Ac is equal to the cross sectional area of the housing cavity.

18. A friction coupling, comprising:
   a housing having a cavity; at least two opposing surfaces located in the cavity;
   a means to drive one surface relative to the opposing surface;
   a means for bringing said surfaces adjacent to each other; and
   said surfaces located in a specific amount of viscous fluid entrained with air wherein said amount of fluid is directly related to the ratio of the area of the opposing surfaces to the cross-sectional area of the cavity.

* * * * *